(12) United States Patent
Thubert et al.

(10) Patent No.: US 11,070,526 B2
(45) Date of Patent: Jul. 20, 2021

(54) METHOD AND DEVICE FOR SUPPORTING MULTIPLE WIRELESS PROTOCOLS WITH A MEDIUM ACCESS CONTROL PREPROCESSOR

(71) Applicant: Cisco Technology, Inc., San Jose, CA (US)

(72) Inventors: Pascal Thubert, La Colle sur Loup (FR); Xiaoguang Jason Chen, San Jose, CA (US); Samuel Rene Andre Pasquier, San Ramon, CA (US); Ways Hassas, Oakland, CA (US); Christopher Scott Atherton Cheadle, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 189 days.

(21) Appl. No.: 16/156,176

(22) Filed: Oct. 10, 2018

(65) Prior Publication Data
US 2020/0120070 A1    Apr. 16, 2020

(51) Int. Cl.
*H04L 29/06* (2006.01)
*H04L 12/46* (2006.01)
*H04L 12/66* (2006.01)

(52) U.S. Cl.
CPC ...... *H04L 63/0428* (2013.01); *H04L 12/4641* (2013.01); *H04L 12/66* (2013.01); *H04L 69/08* (2013.01)

(58) Field of Classification Search
CPC . H04L 63/0428; H04L 12/4641; H04L 12/66; H04L 69/08; H04L 12/4633; H04L 12/4625

USPC .......................................................... 713/168
See application file for complete search history.

(56) References Cited

U.S. PATENT DOCUMENTS

| 8,169,980 B2 | 5/2012 | Dravida et al. |
| 8,817,766 B2 | 8/2014 | Sherman |
| 2007/0291752 A1* | 12/2007 | Ben-Dvora ............ H04L 45/54 370/389 |

(Continued)

OTHER PUBLICATIONS

Maria Rita Palattella et al., "Internet of Things in the 5G Era: Enablers, Architecture and Business Models", 10.1109/JSAC.2016.2525418, IEEE Journal on Selected Areas in Communications, Aug. 2015, 17 pages.

(Continued)

*Primary Examiner* — Mohammad W Reza

(57) ABSTRACT

In one embodiment, a method includes: obtaining a multi-protocol schedule, wherein the multi-protocol schedule includes scheduling information characterizing packets associated with a plurality of wireless protocols, wherein each of the plurality of wireless protocols is associated with a respective virtual gateway of a plurality of virtual gateways; detecting, by a wireless transceiver, a first packet related to a first wireless protocol of the plurality of wireless protocols based on the multi-protocol schedule; and transmitting, by the wireless transceiver, the first packet related to the first wireless protocol to a first virtual gateway of the plurality of virtual gateways. According to some embodiments, the method is performed by a device (e.g., a MAC preprocessor) that includes a wireless transceiver, one or more processors, and non-transitory memory.

20 Claims, 11 Drawing Sheets

(56) References Cited

U.S. PATENT DOCUMENTS

| | | | |
|---|---|---|---|
| 2013/0308617 A1* | 11/2013 | Chuah | H04L 45/50 |
| | | | 370/338 |
| 2014/0092828 A1 | 4/2014 | Sirotkin | |
| 2014/0328290 A1* | 11/2014 | de la Broise | H04W 72/1215 |
| | | | 370/329 |
| 2017/0064042 A1 | 3/2017 | Vora et al. | |
| 2017/0064045 A1 | 3/2017 | Pai et al. | |
| 2019/0069315 A1* | 2/2019 | Raghu | H04W 72/1289 |

OTHER PUBLICATIONS

Anders Asperheim et al., "Design and Implementation of a Rudimentary WirelessHART Network", Aug. 9, 2012, 249 pages.
Kyeong Tae Kim et al., "An Industrial IoT MAC Protocol Based on IEEE 802.15.4e TSCH for a Large-Scale Network", ISBN 978-89-968650-9-4, ICACT2017, Feb. 19-22, 2017, 4 pages.
Viavi Solutions, "Radio Access Networks Interference Analysis," 2015, pp. 1-8, available at https://www.viavisolutions.com/en-us/literature/radio-access-networks-interference-analysis-application-notes-en.pdf.
Asperheim et al., "Design and Implementation of a Rudimentary WirelessHART Network," Univ. of Oslo, Aug. 2012, pp. 1-195.
Kim et al., "An industrial IoT MAC protocol based on IEEE 802.15.4e TSCH for a large-scale network," ICACT2017, Feb. 2017, pp. 104.

\* cited by examiner

METHOD AND DEVICE FOR SUPPORTING MULTIPLE WIRELESS PROTOCOLS WITH A MEDIUM ACCESS CONTROL PREPROCESSOR

TECHNICAL FIELD

The present disclosure generally relates to network routing, and, in particular, to systems, methods, and devices for supporting multiple wireless protocols with a medium access control (MAC) preprocessor in combination with agnostic hardware components and protocol-specific virtual gateways.

BACKGROUND

The ongoing development of data networks often involves enabling greater connectivity by expanding the area covered by a network and/or improving the robustness of accessible coverage within a particular area. Wireless access points (APs) simplify the deployment network infrastructure equipment and enable rapid installation and/or expansion of a network within a coverage area. As a result, various data networks from local area networks (LANs) to wide area networks (WANs) often include a number of wireless APs. The wireless APs facilitate device mobility by providing relatively seamless access to a network throughout a coverage area.

In order to satisfy demand for wireless connectivity, wireless APs include increasingly complicated and power-hungry hardware. For example, wireless APs typically include several radio frequency (RF) radios in order to provide sufficient coverage and accommodate various networking protocols (e.g., Institute of Electrical and Electronics Engineers (IEEE) 802.11g, IEEE 802.11n, IEEE 802.11ac, IEEE 802.15, BLUETOOTH, IEEE 802.15.4 (ZIGBEE), and/or the like). To this end, some wireless APs include a micro-controller that support different protocols (e.g., International Society of Automation (ISA) 100.11a or Wireless Highway Addressable Remote Transducer Protocol (WirelessHART) connection for industrial process controls) by embedding a printed circuit board (PCB) with support for a full application-level gateway directly in the wireless AP. However, wiring a partner gateway box to a wireless AP over Ethernet or porting third party code inside the wireless AP is cumbersome and leads to both installation errors and compatibility issues. In addition, different protocols such as WirelessHART, ISA 100.11a, and time slotted channel hopping media access control with IPv6 addressing (6TiSCH) include variations of time slotted channel hopping (TSCH) protocols.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1A:
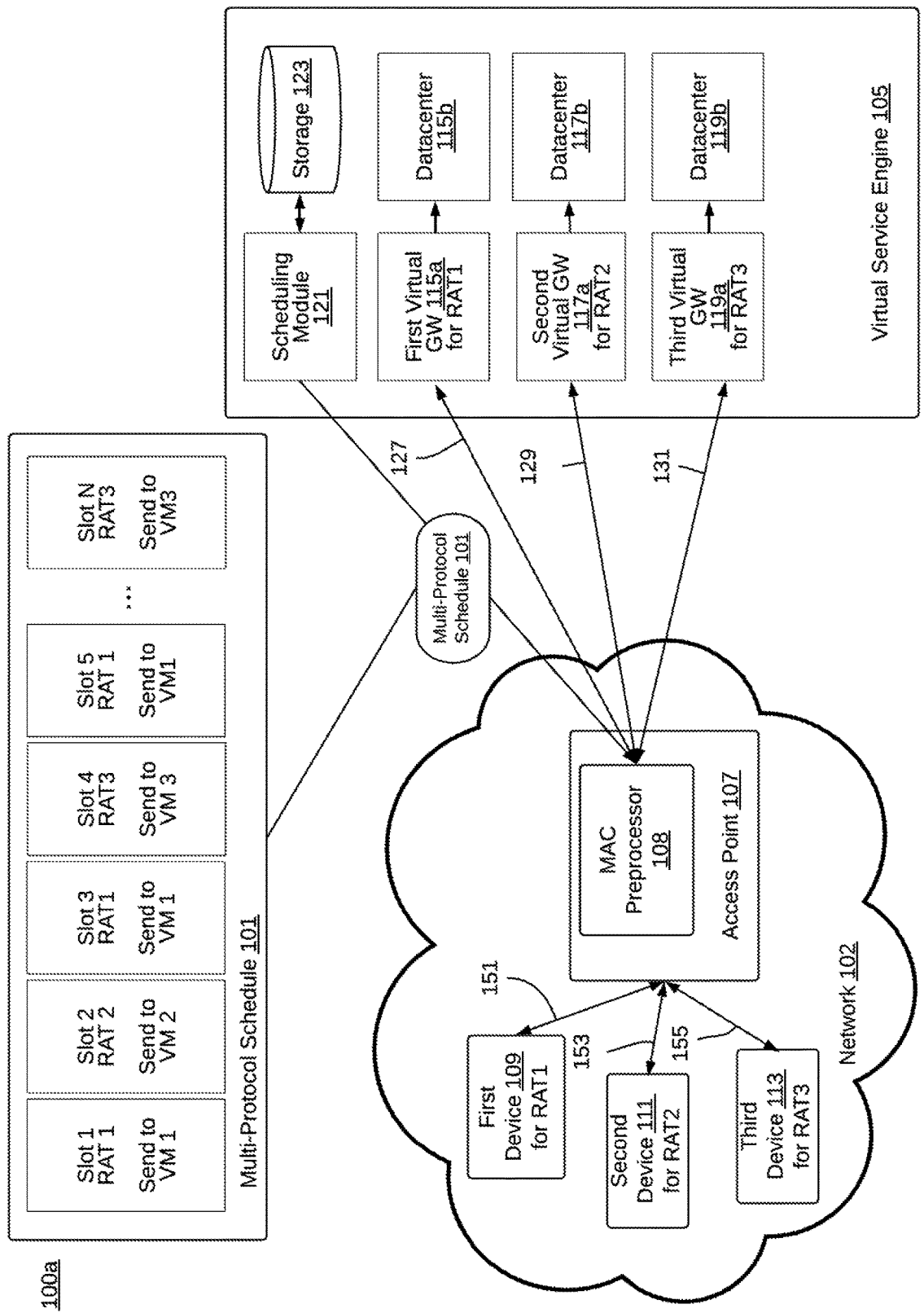
FIG. 1A is a block diagram of an example network environment in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the illustrative embodiments shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example embodiments described herein. While pertinent features are shown and described, those of ordinary skill in the art will appreciate from the present disclosure that various other features, including well-known systems, methods, components, devices and circuits have not been illustrated or described in exhaustive detail for the sake of brevity and so as not to obscure more pertinent aspects of the example embodiments described herein.

Overview

Various embodiments disclosed herein include methods, devices, and systems for detecting protocol-specific packets with an agnostic MAC preprocessor. In some embodiments, the method is performed by a device including a wireless transceiver, one or more processors, and a non-transitory memory (e.g., an agnostic MAC preprocessor within an AP). According to various embodiments, the method includes: obtaining a multi-protocol schedule, wherein the multi-protocol schedule includes scheduling information characterizing packets associated with a plurality of wireless protocols, wherein each of the plurality of wireless protocols is associated with a respective virtual gateway of a plurality of virtual gateways; detecting, by the wireless transceiver, a first packet related to a first wireless protocol of the plurality of wireless protocols based on the multi-protocol schedule (e.g., the first packet is received from user equipment (UE), an end user device, a client device, an Internet-of-Things (IoT) device, or the like); and transmitting, by the wireless transceiver, the first packet related to the first wireless protocol to a first virtual gateway of the plurality of virtual gateways.

In accordance with some embodiments, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some embodiments, a non-transitory computer readable storage medium has stored thereon instructions, which, when executed by one or more processors of a device, cause the device to perform or cause performance of any of the methods described herein. In accordance with some embodiments, a device includes: one or more processors, a non-transitory memory, and means for performing or causing performance of any of the methods described herein.

Example Embodiments

Some previously available wireless APs are capable of supporting multiple wireless protocols. To this end, such previously available wireless APs include dedicated protocol-specific hardware components, such as transceivers, for each wireless protocol that is supported. However, including dedicated protocol-specific hardware components (per protocol) is inefficient and costly. By contrast, in some embodiments, a wireless AP supports multiple wireless protocols with an agnostic MAC preprocessor in combination with agnostic hardware components, and protocol-specific virtual gateways. In accordance with various embodiments, a multi-protocol schedule enables the agnostic MAC preprocessor to detect when packets related to particular wireless protocols are to be transmitted and/or received. As a result, the agnostic MAC preprocessor extracts protocol-specific packets based on the multi-protocol schedule and transmits the packets to protocol-specific virtual gateways.

Figure 1B:
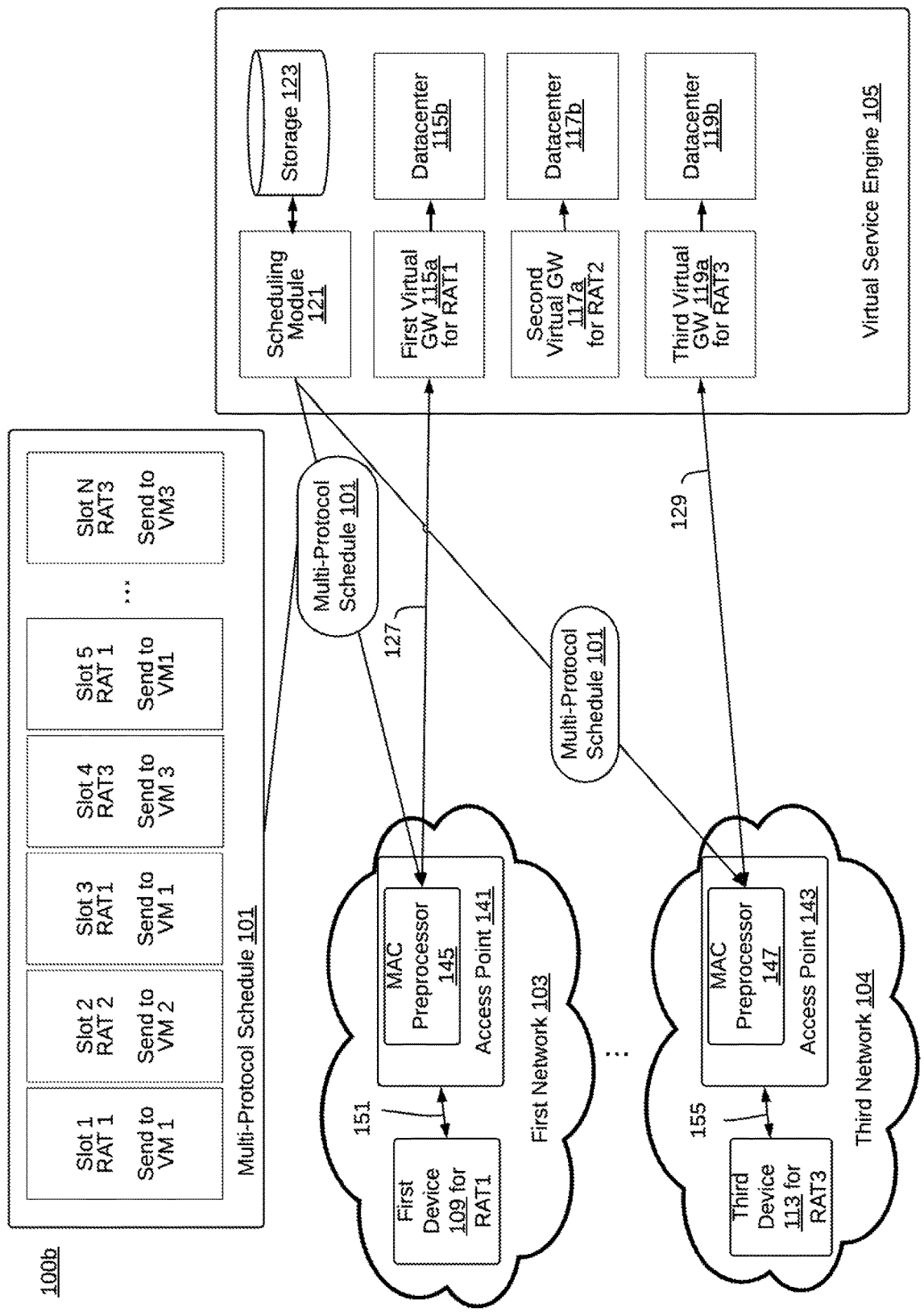
FIG. 1B is a block diagram of another example network environment in accordance with some embodiments.
Figure 1C:
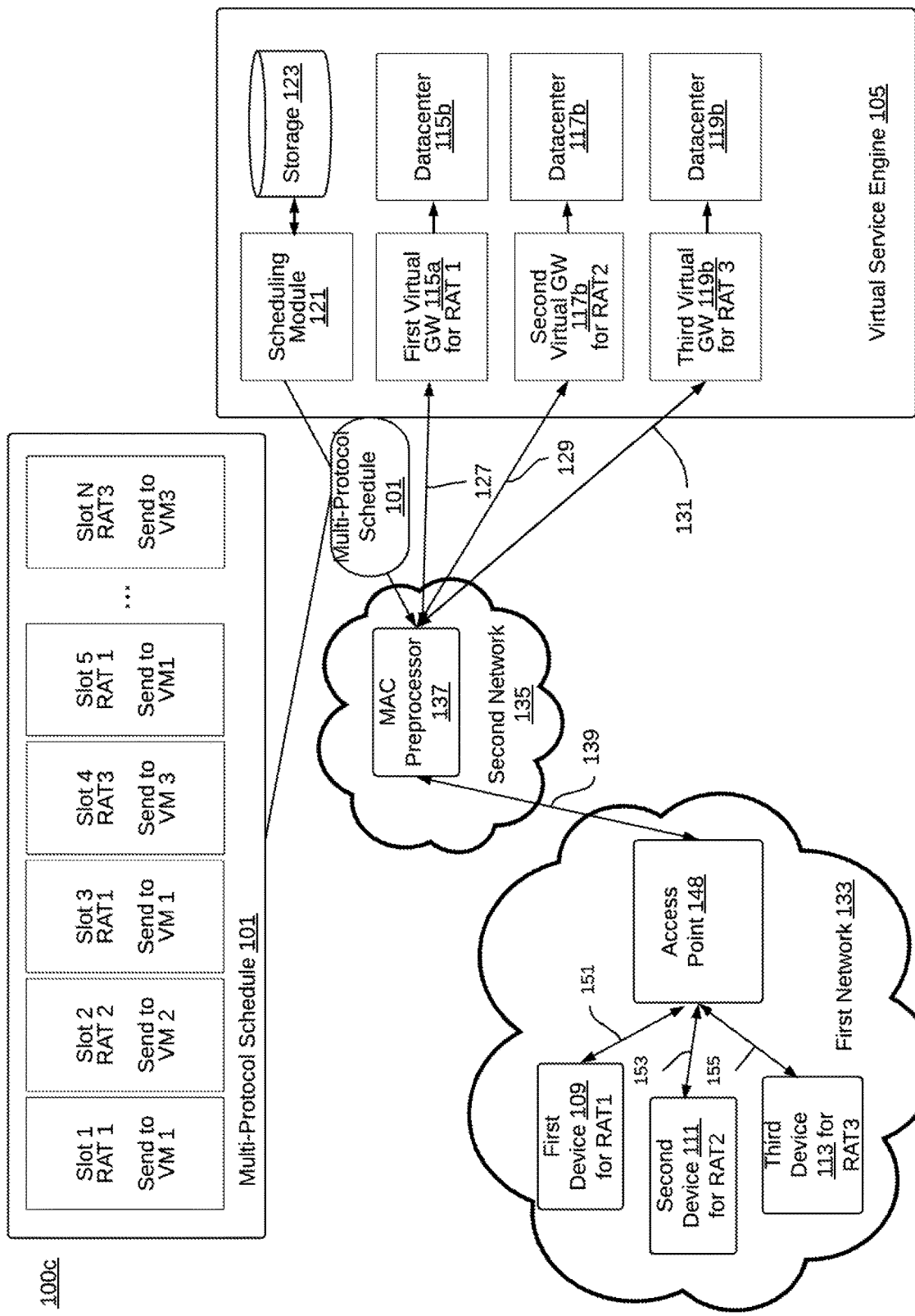
FIG. 1C is a block diagram of yet another example network environment in accordance with some embodiments.

FIGS. 1A-1C are block diagrams of example network environments 100a, 100b, and 100c in accordance with some embodiments. While pertinent features are illustrated, those of ordinary skill in the art will appreciate from the present disclosure that various other features have not been illustrated for the sake of brevity and so as not to obscure more pertinent aspects of the example embodiments disclosed herein. To that end, as a non-limiting example, in FIG. 1A, the example network environment 100a includes a network 102, a virtual service engine 105, and a multi-protocol schedule 101. In some embodiments, those of ordinary skill in the art will appreciate from the present disclosure that the example network environment 100a includes an arbitrary number of devices, virtual gateways, and time slots in the multi-protocol schedule.

FIG. 1A illustrates a block diagram of an example network environment 100a in accordance with some embodiments. As shown in FIG. 1A, the network environment 100a includes the network 102 with various wireless network nodes such as a MAC preprocessor 108, an access point (AP) 107 (e.g., wired or wireless), a first device 109 operating according to a first radio access technology (RAT), a second device 111 operating according to a second RAT, and a third device 113 operating according to a third RAT (e.g., the devices 109, 111, and 113 correspond to UE, end user devices, client devices, IoT devices, or the like) that operate according to different RATs, and the virtual service engine 105. In some embodiments, the AP 107 includes a radio capable of operating according to different physical layers (PHYs) that are used by multiple higher layer protocols. In accordance with some embodiments, the MAC preprocessor 108 is implemented in the AP 107. In some embodiments, the AP 107 includes the MAC preprocessor 108, and a transceiver or radio that can switch its PHY configuration at a time slot in the multi-protocol schedule 101.

In FIG. 1A, the AP 107 is communicatively coupled with the first device 109 operating according to a first RAT via a communication link 151 (e.g., a TSCH wireless link, a Wi-Fi link, a BLUETOOTH link, a ZIGBEE link, or the like). In FIG. 1A, the AP 107 is communicatively coupled with the second device 111 operating according to the second RAT via a communication link 153 (e.g., a TSCH wireless link, a Wi-Fi link, a BLUETOOTH link, a ZIGBEE link, or the like). In FIG. 1A, the AP 107 is communicatively coupled with the third device 113 operating according to the third RAT via a communication link 155 (e.g., a TSCH wireless link, a Wi-Fi link, a BLUETOOTH link, a ZIGBEE link, or the like). As such, in FIG. 1A, the AP 107 operates in a transmission mode in the example network environment 100a. According to some embodiments, those of ordinary skill in the art will appreciate from the present disclosure that the virtual service engine 105 includes an arbitrary number of virtual gateways for different RATs, and the network 102 includes an arbitrary number of devices. As such, various other embodiments may include a greater or lesser number of virtual gateways for different RATs and devices.

In some embodiments, the virtual service engine 105 includes a first virtual gateway 115a operating according to a first RAT, a local datacenter 115b that is connected to the first virtual gateway 115a operating according to the first RAT, a second virtual gateway 117a operating according to a second RAT, a local datacenter 117b that is connected to the second virtual gateway 117a operating according to the third RAT, and a third virtual gateway 119a operating according to the third RAT, a local datacenter 119b connected to the third virtual gateway 119a operating according to the third RAT, a scheduling module 121, and a storage 123 connected to a scheduling module 121.

According to some embodiments, the first virtual gateway 115a operating according to the first RAT is communicatively coupled with the first device 109 operating according to the first RAT via a communication link 127 (e.g., an Ethernet link, a fiber link, a Wi-Fi link, a WirelessHART link, a ISA 100.11a link, a BLUETOOH link, a ZIGBEE link, or the like) through the AP 107, where the communication link 127 provides the first virtual gateway 115a operating according to the first RAT with functionality to communicate with the first device 109 operating according to the first RAT using the communication link 127. According to some embodiments, those of ordinary skill in the art will appreciate from the present disclosure that the first virtual gateway 115a includes an arbitrary number of communication interfaces and associated communication links and that various other embodiments may include a greater number of interfaces and associated communication links.

Similarly, in accordance with some embodiments, the second virtual gateway 117a operating according to the second RAT is communicatively coupled with the second device 111 operating according to the second RAT via a communication link 129 (e.g., an Ethernet link, a fiber link, a Wi-Fi link, a WirelessHART link, a ISA 100.11a link, a BLUETOOH link, a ZIGBEE link, or the like) through the AP 107, where the communication link 129 provides the second virtual gateway 117a operating according to the second RAT with functionality to communicate with the second device 111 operating according to the second RAT using the communication link 129. According to some embodiments, those of ordinary skill in the art will appreciate from the present disclosure that the second virtual gateway 117*a* operating according to the second RAT includes an arbitrary number of communication interfaces and associated communication links and that various other embodiments may include a greater number of interfaces and associated communication links.

Similarly, in accordance with some embodiments, the third virtual gateway 119*a* operating according to the third RAT is communicatively coupled with the third device 113 operating according to the third RAT via a communication link 131 (e.g., (e.g., an Ethernet link, a fiber link, a Wi-Fi link, a WirelessHART link, a ISA 100.11a link, a BLUETOOH link, a ZIGBEE link, or the like) through the AP 107, where the communication link 131 provides the third virtual gateway 119*a* operating according to the third RAT with functionality to communicate with the third device 113 operating according to the third RAT using the communication link 131. According to some embodiments, those of ordinary skill in the art will appreciate from the present disclosure that the third virtual gateway 119*a* operating according to the third RAT includes an arbitrary number of communication interfaces and associated communication links and that various other embodiments may include a greater number of interfaces and associated communication links.

In some embodiments, the first virtual gateway 115*a* operating according to the first RAT, the second virtual gateway 117*a* operating according to the second RAT, and third virtual gateway 119*a* operating according to the third RAT correspond to virtualized routers, virtualized switches, virtualized hubs, virtualized servers, virtualized modems, or the like. In some embodiments, the first device 109 operating according to the first RAT, the second device 111 operating according to the second RAT, and the third device 113 operating according to the third RAT correspond to desktop computers, tablet computers, mobile phones, personal digital assistant (PDAs), wearable computing devices, set-top boxes (STBs), over-the-top (OTT) boxes, smart displays, teleconference equipment, or the like.

In some embodiments, the virtual service engine 105 sends the multi-protocol schedule 101 to the MAC preprocessor 108 using a scheduling module 121. In some embodiments, the multi-protocol schedule 101 corresponds to a lookup table of time slots. For example, as shown in FIG. 1A, the multi-protocol schedule 101 assigns a first time slot, a third time slot, and a fifth time slot to a first RAT, assigns a second time slot to a second RAT, a fourth time slot to a third RAT, and so forth. In some embodiments, the time slots are assigned to a particular RAT and a corresponding action (e.g., send, receive, wait, etc.) for the particular RAT. According to some embodiments, those of ordinary skill in the art will appreciate from the present disclosure that the multi-protocol schedule 101 includes an arbitrary number of time slots. As such, various other embodiments may include a greater or lesser number of time slots for different RATs.

In some embodiments, the MAC preprocessor 108 and/or the virtual service engine 105 stores the multi-protocol schedule 101 in the storage 123. In some embodiments, the multi-protocol schedule 101 includes scheduling information for packets related to a plurality of wireless protocols. In some embodiments, the scheduling information includes at least one of a time slot for packets related to particular wireless protocols, channel information for the packets related to the particular wireless protocols, and key information for decrypting the packets related to the particular wireless protocols. In some embodiments, the packets are transported over a tunnel that includes a header with scheduling information (e.g., transmit time, receive time, channel, security association, etc.). In some embodiments, each of the plurality of wireless protocols is associated with a respective virtual gateway in the virtual service engine 105.

FIG. 1B illustrates a block diagram of another example network environment 100*b* in accordance with some embodiments. As shown in FIG. 1B, the network environment 100*b* includes a first network 103 with various wireless network nodes that operate according to a first RAT, such as an AP 141, a MAC preprocessor 145 and a first device 109 operating according to the first RAT. As shown in FIG. 1B, the network environment 100*b* also includes at least a third network 104 with various wireless network nodes that operate according to a third RAT such as an AP 143, a MAC preprocessor 147 and a third device 113 operating according to the third RAT. In contrast to FIG. 1A, which includes a MAC preprocessor 108 and a radio capable of operating according to different PHYs that are used by multiple higher layer protocols, the network environment 100*b* includes a separate MAC preprocessor (e.g., the MAC preprocessor 145 and the MAC preprocessor 147) for each wireless protocol. As such, the AP 141 that operates according to the first RAT includes the MAC preprocessor 145, and the AP 143 that operates according to the second RAT includes the MAC preprocessor 147. Accordingly, the AP 141 is communicatively coupled with the first device 109 operating according to a first RAT via the communication link 151, and the AP 143 is communicatively coupled with the third device 113 operating according to a third RAT via a communication link 155. In some embodiments, those of ordinary skill in the art will appreciate from the present disclosure that the network environment 100*b* includes an arbitrary number of devices, virtual gateways, and time slots in the multi-protocol schedule 101.

FIG. 1C illustrates a block diagram of yet another example network environment 100*c* in accordance with some embodiments. As shown in FIG. 1C, the network environment 100*c* includes a first network 133 with an AP 148, and various wireless network nodes that operate according to different RATs. For example, as shown in FIG. 1C, the various wireless network nodes include a first device 109 operating according to a first RAT, a second device 111 operating according to a second RAT, and a third device 113 operating according to a third RAT. Accordingly, the AP 148 is communicatively coupled with: the first device 109 operating according to a first RAT via the communication link 151; the second device 111 operating according to a second RAT via a communication link 153; and the third device 113 operating according to a third RAT via a communication link 155. Furthermore, as shown in FIG. 1C, a second network 135 includes a MAC preprocessor 137. In contrast to FIGS. 1A and 1B, which include a MAC preprocessor in the same networks as the devices 109, 111, and 113, the network environment 100*c* includes a MAC preprocessor 137 that is remote to both the virtual service engine 105 and the AP 148. In some embodiments, the MAC preprocessor 137 and the AP 148 are linked together by a communication link 139. In some embodiments, those of ordinary skill in the art will appreciate from the present disclosure that the network environment 100*c* includes an arbitrary number of devices, virtual gateways, and time slots in the multi-protocol schedule.

Figure 2:
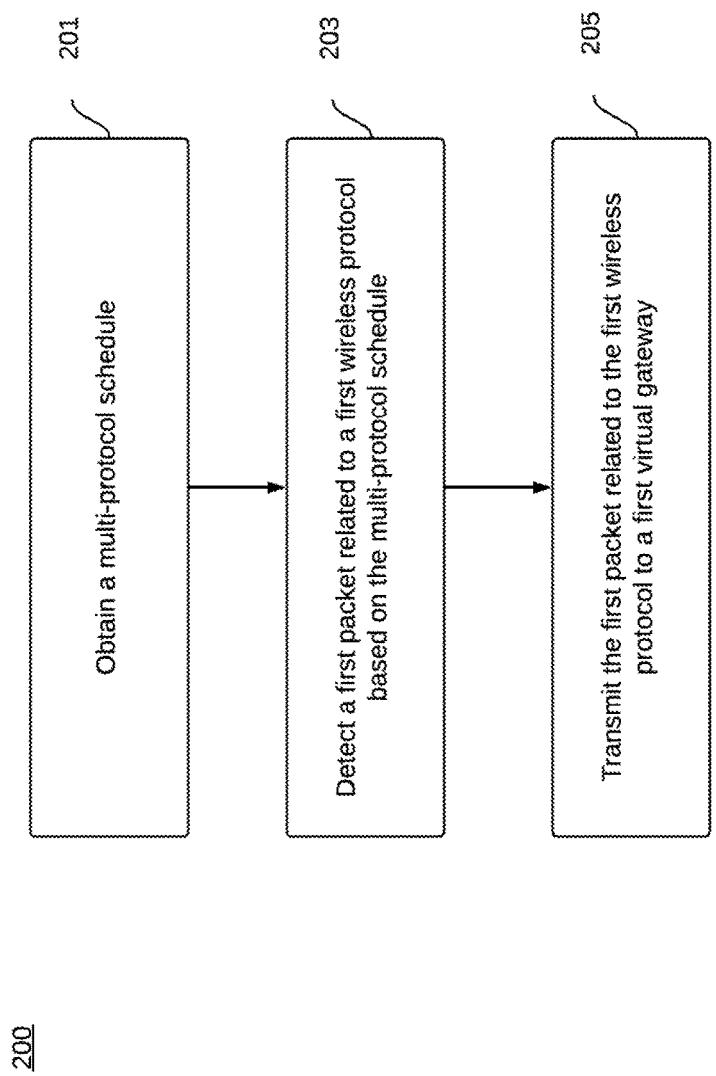
FIG. 2 is a flowchart representation of a method of detecting and transmitting packets in accordance with some embodiments.

FIG. 2 is a flowchart representation of a method 200 of detecting and transmitting packets with a MAC preprocessor in combination with agnostic hardware components and protocol-specific virtual gateways in accordance with some embodiments. In some embodiments, the method 200 is performed by a device including a MAC preprocessor (e.g., the MAC preprocessor 108 shown in FIG. 1A, the MAC preprocessors 145 and 147 shown in FIG. 1B, or the MAC preprocessor 137 shown in FIG. 1C) or an associated AP (e.g., the AP 107 shown in FIG. 1A, the APs 141 and 143 shown in FIG. 1B, or the AP 148 shown in FIG. 1C). In some embodiments, a set of computer readable instructions that are executed at a device including the MAC preprocessor (e.g., a MAC preprocessor such as the MAC preprocessor 108 shown in FIG. 1A, the MAC preprocessors 145 and 147 shown in FIG. 1B, or the MAC preprocessor 137 shown in FIG. 1C) or the associated AP (e.g., the AP 107 shown in FIG. 1A, the APs 141 and 143 shown in FIG. 1B, or the AP 148 shown in FIG. 1C) implements the method 200.

To that end, as represented by block 201, the method 200 includes obtaining a multi-protocol schedule (e.g., the multi-protocol schedule 101 shown in FIGS. 1A-1C) that includes scheduling information for packets related to a plurality of wireless protocols. In some embodiments, the MAC preprocessor obtains the multi-protocol schedule 101 from the storage 123 via the scheduling module 121. In some embodiments, a single-protocol schedule may be obtained for each individual wireless gateway (e.g., the first virtual gateway 115a operating according to the first RAT, the second virtual gateway 117a operating according to the second RAT, or the third virtual gateway 119a operating according to the third RAT shown in FIGS. 1A-1C) from the scheduling module 121.

For example, with reference to FIG. 1A, the MAC preprocessor 108 obtains a first single-protocol schedule corresponding to the first RAT from the first virtual gateway 115a operating according to the first RAT, and the MAC preprocessor 108 also obtains a second single-protocol schedule corresponding to the second RAT from the second virtual gateway 117a operating according to the second RAT. In some embodiments, the MAC preprocessor 108 combines the single protocol schedules in order to form a multi-protocol schedule after receiving the single-protocol schedules. As another example, with reference to FIG. 1B, the virtual service engine 105 combines the single protocol schedules before sending the multi-protocol schedule 101 to each MAC preprocessor (e.g., the MAC preprocessors 145 and 147 shown in FIG. 1B) within the example network environment 100b. In some embodiments, with reference to FIG. 1C, the virtual service engine 105 sends the multi-protocol schedule 101 to a remote MAC preprocessor (e.g., the MAC preprocessor 137 shown in FIG. 1C) before the MAC preprocessor communicates with the AP (e.g., the AP 148 shown in FIG. 1C).

In some embodiments, the scheduling information includes at least one of a time slot for packets related to particular wireless protocols, channel information for the packets related to the particular wireless protocols, and key information for decrypting the packets related to the particular wireless protocols. The multi-protocol schedule 101 instructs each node what to do in each time slot: transmit, receive, or sleep. The multi-protocol schedule 101 also determines the end-to-end delay of the packet transmission and the bandwidth of the network. Additionally, the multi-protocol schedule 101 generates consecutive time slots along the packet forwarding path in order to minimize the end-to-end delay of the packet transmission.

As represented by block 203, the method 200 includes detecting a first packet related to a first wireless protocol of the plurality of wireless protocols based on the multi-protocol schedule. For example, with reference to FIG. 1A, the MAC preprocessor 108 detects a first packet related to the first RAT during a time slot and according to a frequency (or channel) indicated by the multi-protocol schedule. In some embodiments, an Internet-of-Things Wireless Application Protocol (IoTWAP) is aware of time slots and synchronization times with the virtual service engine 105 and controls when a device, such as a wireless AP, is detecting or transmitting packets and on which channel. In some embodiments, the IoTWAP consists of a set of application programming interfaces (APIs) that allow a remote AP to tunnel frame and exchange control with another AP.

As represented by block 205, the method 200 includes transmitting the first packet related to the first wireless protocol to a first gateway of the plurality of virtual gateways. In some embodiments, the first virtual gateway (e.g., the virtual gateway 115a operating according to the first RAT shown in FIGS. 1A-1C) operating according to the first RAT processes packets that are related to the first wireless protocol. In some embodiments, the MAC preprocessor identifies a corresponding virtual gateway, and tunnels the packets to the identified virtual gateway over the IoTWAP to the wireless AP. In some embodiments, the packets are then injected in an identified virtualized gateway in order to emulate a packet coming from a local radio. In some embodiments, a packet specifies which time slot the packet was received in and which channel the packet was received on. In some embodiments, transmitting the first packet includes tunneling the first packet through an upper MAC. In some embodiments, a device implements the upper MAC in the wireless AP. In some embodiments, the wireless AP runs multiple slot-frames of the different wireless protocols with a global priority.

In some embodiments, the AP includes a MAC preprocessor that injects packets from a virtual gateway at an explicit time and channel into a device and also knows when and where to detect packets for a particular wireless protocol (e.g., the AP 107 shown in FIG. 1A, the APs 141 and 143 shown in FIG. 1B, or the AP 148 shown in FIG. 1C). For example, an agnostic TSCH MAC extracts WiHART and/or ISA 100.11 packets and tunnels them to a virtual machine running a virtual WiHART or ISA 100.11 gateway for further processing.

A TSCH is a channel access method for shared medium networks. The TSCH is a core mechanism of common wireless communication standards targeting the Internet-of-Things (IoT) domain such as WirelessHART, ISA 100.11a, and IEEE 802.15.4e. The TSCH can be understood as a combination of time division multiple access (TDMA) and frequency-division multiple access (FDMA) mechanisms because it uses diversity in time and frequency to provide reliability to upper network layers. TSCH reduces the impact of the wireless medium unpredictability to enable the use of reliable low-power wireless networks. As such, TSCH is good at saving the node's energy because each node shares a schedule that allows it to know in advance when to turn on or off its radio. To that end, in some embodiments, different protocols are assigned to different time slots so there is much less radio frequency (RF) interference than if multiple independent radios are used to cover the different wireless protocols. For example, as shown in FIG. 1A-C, the multi-protocol schedule 101 includes a first time slot, a third time slot, and a fifth time slot assigned to a first RAT, a second time slot assigned to a second RAT, a fourth time slot assigned to a third RAT, and so forth.

Figure 3:
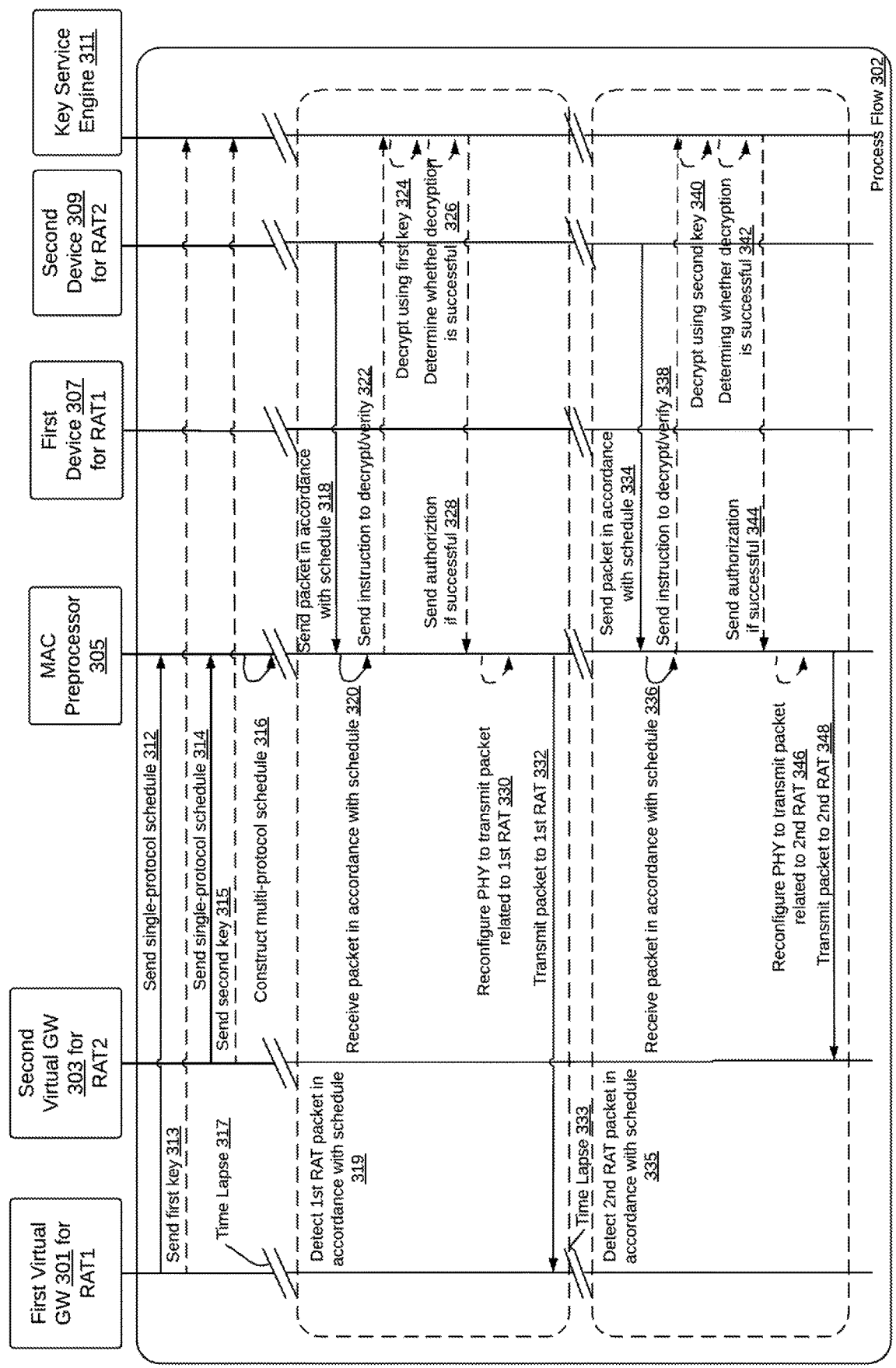
FIG. 3 is a process flow diagram illustrating the detection and transmission of packets based on a multi-protocol schedule in accordance with some embodiments.

FIG. 3 depicts a process flow 302 implemented by a system for detecting and transmitting a packet with a MAC preprocessor in accordance with some embodiments. As an option, one or more instances of the process flow 302 or any aspect thereof may be implemented in the context of the architecture and functionality of the embodiments described herein. Also, the process flow 302 or any aspect thereof may be implemented in any desired environment. In some embodiments, a first virtual gateway 301 operating according to a first RAT, a second virtual gateway 303 operating according to a second RAT, a MAC preprocessor 305, a first device 307 operating according to the first RAT, a second device 309 operating according to the second RAT, and a key service engine 311 exhibit a set of high-level interactions (e.g., operations, messages, etc.) as shown in the process flow 302 in FIG. 3.

In some embodiments, as represented by operation 312, the first virtual gateway 301 operating according to the first RAT sends a single-protocol schedule associated with the first RAT to the MAC preprocessor 305. In some embodiments, as represented by operation 313, the first virtual gateway 301 operating according to the first RAT sends a first key associated with the first RAT to the key service engine 311.

In some embodiments, as represented by operation 314, the second virtual gateway for the second RAT 303 sends a single-protocol schedule associated with the second RAT to the MAC preprocessor 305. In some embodiments, the second virtual gateway 303 operating according to the second RAT sends a second key associated with the second RAT to the key service engine 311.

In some embodiments, as represented by operation 316, the MAC preprocessor 305 merges the single protocol schedules to form a multi-protocol schedule (e.g., the multi-protocol schedule 101 shown in FIGS. 1A-1C). In accordance with some embodiments, the virtual service engine (e.g., the virtual service engine 105 shown in FIGS. 1A-1C) merges the single protocol schedules in order to form the multi-protocol schedule before sending the multi-protocol schedule to the MAC preprocessor.

In some embodiments, after an optional time lapse 317, the process flow 302 includes the MAC preprocessor 305 detecting a first packet related to a first RAT in accordance with a multi-protocol schedule as represented by operation 319. In some embodiments, as represented by operation 318, the first device 307 operating according to the first RAT sends a packet in accordance with the multi-protocol schedule. In some embodiments, as represented by operation 320, the MAC preprocessor 305 receives the packet in accordance with the multi-protocol schedule.

In some embodiments, as represented by operation 322, which is below described in greater detail in FIG. 5, the MAC preprocessor 305 sends an instruction to decrypt and/or verify the packet at the key service engine 311. In some embodiments, the key service engine 311 facilitates remote key management services in the network environment. In some embodiments, the key service engine can include, for example, a request interface, a key service engine proxy, and a key encryption/decryption engine. Additional or fewer components/modules/engines can be included in the key service engine 311. The key service engine 311 includes a key encryption/decryption engine that can provide a first layer of encryption or decryption for an encryption key. In some embodiments, as represented by operation 324, when receiving the first packet, the key service engine 311 decrypts the first packet using the first key obtained from the first virtual gateway 301. In some embodiments, as represented by operation 326, the key service engine 311 determines whether decryption and/or authorization is successful.

In some embodiments, as represented by operation 328, the key service engine 311 sends an authorization message if the decryption and/or authorization is successful. In some embodiments, if the packet cannot be decrypted and/or authorized, then the packet is not sent. In some embodiments, as represented by operation 330, the MAC preprocessor or the AP reconfigures the PHY in order to receive or transmit the packet related to the first RAT to the first virtual gateway 301 operating according to the first RAT. In some embodiments, as represented by operation 332, the MAC preprocessor 305 transmits the packet to the first virtual gateway operating according to the first RAT in accordance to whether the decryption and verification steps are successful. If decryption or verification is not successful, then the MAC preprocessor 305 will not transmit the first packet to the first virtual gateway 301 operating according to the first RAT.

In some embodiments, after another optional time lapse 333, the process flow 302 includes the MAC preprocessor 305 detecting a second packet related to a second RAT in accordance with a multi-protocol schedule as represented by operation 335. In some embodiments, as represented by operation 334, the second device 309 operating according to the second RAT sends a packet in accordance with the multi-protocol schedule. In some embodiments, as represented by operation 336, the MAC preprocessor 305 receives the second packet in accordance with the multi-protocol schedule. In some embodiments, as represented by operation 338, after receiving the second packet, the MAC preprocessor 305 sends an instruction to decrypt and/or verify the second packet. In some embodiments, as represented by operation 340, the key service engine 311 decrypts the second packet using a second key. In some embodiments, as represented by operation 342, the key service engine 311 determines whether decryption and/or authorization is successful.

In some embodiments, as represented by operation 344, the key service engine 311 sends an authorization message if the decryption and/or authorization is successful. In some embodiments, as represented by operation 346, the MAC preprocessor 305 or its associated AP reconfigures the PHY in order to transmit or receive the second packet related to the second RAT. Finally, as represented by operation 348, the MAC preprocessor 305 transmits the second packet related to the second RAT to the second virtual gateway 303 operating according to the second RAT in the virtual service engine in accordance to whether decryption and verification are successful. If decryption or verification is not successful, then the MAC preprocessor 305 will not transmit to the second packet to the second virtual gateway 303 operating according to the second RAT.

For the sake of brevity, FIG. 3 shows a single occurrence of detecting and transmitting a first packet related to a first RAT and a second packet related to a second RAT in accordance with the multi-based protocol schedule. In some embodiments, the process flow 302 includes multiple occurrences of detecting and transmitting of packets associated with different RATs in accordance with the multi-based protocol schedule. In some embodiments, the process flow 302 includes determining whether to send the first packet to the first virtual gateway 301 operating according to the first RAT or to the second virtual gateway 303 operating according to the second RAT based on the multi-protocol schedule.

Figure 4:
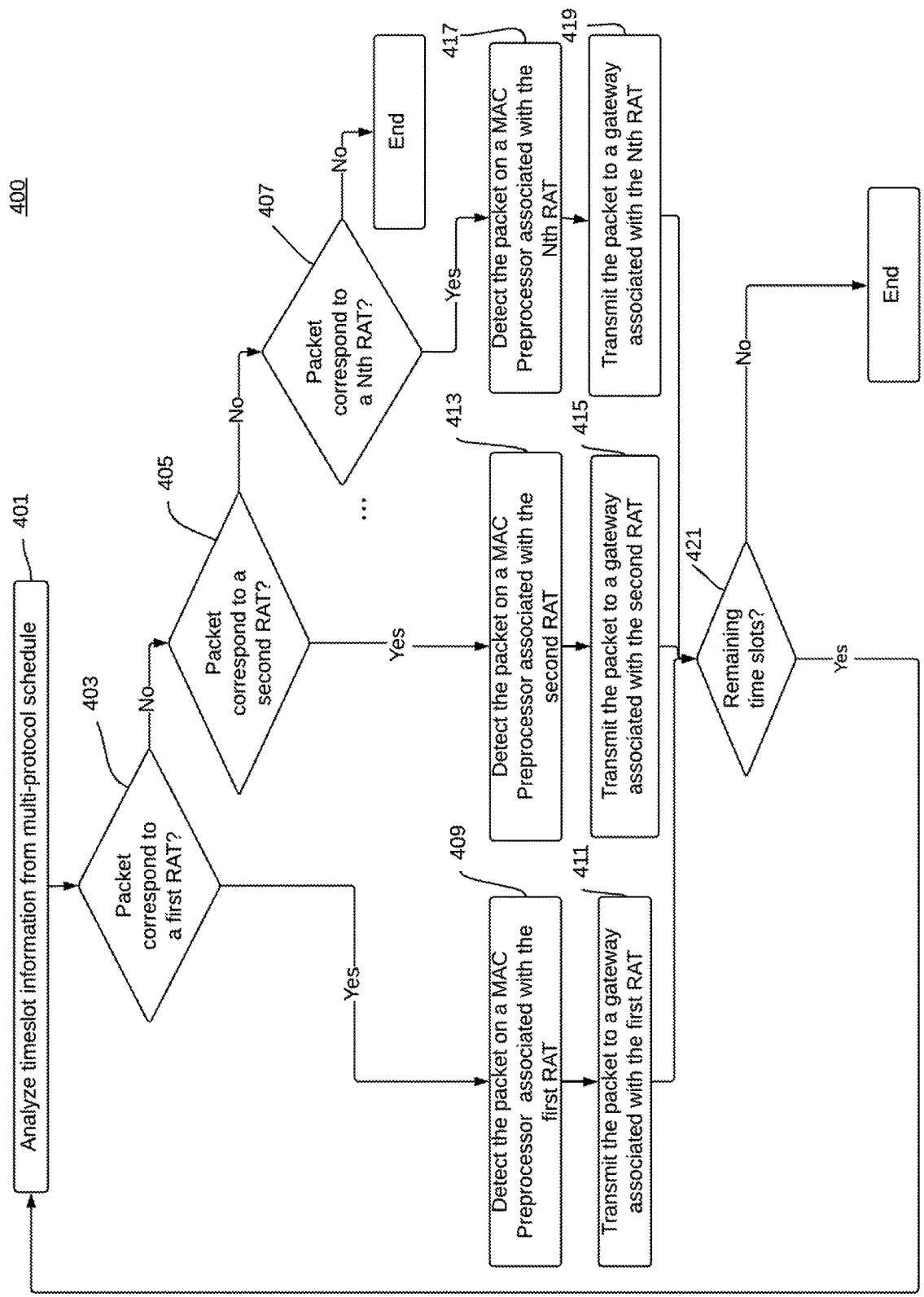
FIG. 4 is a flowchart representation of a method of detecting and transmitting packets with a plurality of MAC preprocessors in accordance with some embodiments.

FIG. 4 is a flowchart representation of a method 400 of detecting and transmitting packets with a plurality of wireless APs with agnostic MAC preprocessors in a network environment (e.g., the example network environment 100b shown in FIG. 1B) in accordance with some embodiments. In some embodiments, the method 400 is performed by a device including a MAC preprocessor (e.g., the first MAC preprocessor 145 and a third MAC preprocessor 147 shown in FIG. 1B) or an associated AP (e.g., the APs 141 and 143 shown in FIG. 1B). In some embodiments, a set of computer readable instructions that are executed at a device including the MAC preprocessor (e.g., the first MAC preprocessor 145 and a third MAC preprocessor 147 shown in FIG. 1B) or the associated AP (e.g., the APs 141 and 143 shown in FIG. 1B) implements the method 400.

To that end, as represented by block 401, the method 400 includes analyzing time slot information from a multi-protocol schedule (e.g., the multi-protocol schedule 101 shown in FIGS. 1A-1C). Using the time slot information from the multi-protocol schedule, as represented by block 403, the method 400 includes determining whether the first packet corresponds to a first RAT. If the first packet does not correspond to a first RAT ("No" path from block 403), then the method 400 includes determining whether the first packet corresponds to a second RAT as represented by block 405. If the first packet does not correspond to a second RAT ("No" path from block 405), the method 400 includes determining whether the first packet corresponds to an Nth RAT as represented by block 407. If the first packet does not correspond to the Nth RAT ("No" path from block 407), then the method 400 ends.

On the other hand, as represented by block 409, if the first packet corresponds to a first RAT ("Yes" path from block 403), the method 400 includes detecting the first packet on a MAC preprocessor associated with the first RAT (e.g., the MAC preprocessor 145 shown in FIG. 1B). In some embodiments, as represented by block 411, the MAC preprocessor associated with the first RAT transmits the first packet to a first virtual gateway also associated with the first RAT (e.g., the first virtual gateway 115a operating according to the first RAT shown in FIG. 1B).

In some embodiments, as represented by block 421, the method 400 includes determining whether there are any remaining time slots in the multi-protocol schedule. If there are remaining time slots ("Yes" path from block 421), the method 400 includes returning to block 401 and analyzing a subsequent time slot in the multi-protocol schedule. In other words, the method 400 includes repeating the process for the subsequent time slot in the multi-protocol schedule. On the other hand, if there are no more remaining time slots in the multi-protocol schedule ("No" path from block 421), then the method 400 ends.

On the other hand, if the packet does not correspond to the first RAT, ("No" path from block 403), the method 400 includes determining whether the packet corresponds to a second RAT as represented by block 405. If the packet does correspond to a second RAT ("Yes" path from block 405), then, as represented by block 413, the method includes detecting the packet on a MAC preprocessor associated with the second RAT (e.g., the MAC preprocessor 147 shown in FIG. 1B). Next, as represented by block 415, the MAC preprocessor associated with the second RAT transmits the packet to a second gateway associated with the second RAT (e.g., the second virtual gateway 117a operating according to the second RAT shown in FIG. 1B). As mentioned above, in some embodiments, as represented by block 421, the method 400 includes determining whether there are any remaining time slots.

On the other hand, if the packet does not correspond to the second RAT, ("No" path from block 405) then the method 400 includes determining whether the packet corresponds to an Nth RAT as represented by block 407. If the packet does correspond to an Nth RAT ("Yes" path from 407), then, as represented by block 417, the method 400 includes detecting the packet associated with the Nth RAT. Next, as represented by block 419, the MAC preprocessor transmits the packet to an Nth gateway associated with the Nth RAT. As mentioned above, in some embodiments, as represented by block 421, the method 400 includes determining whether there are any remaining time slots.

Figure 5:
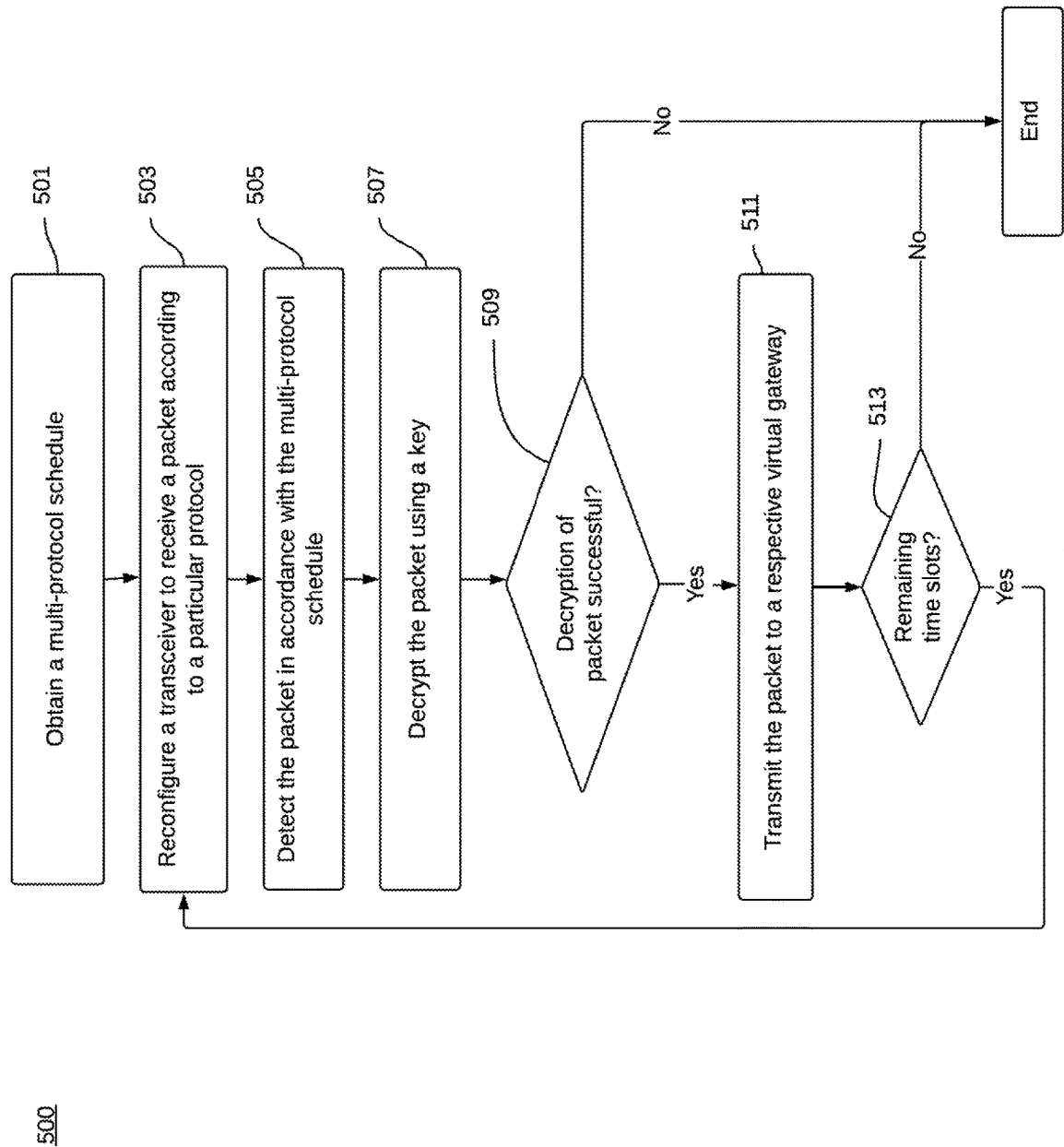
FIG. 5 is a flowchart representation of a method of detecting and transmitting packets with encryption in accordance with some embodiments.

FIG. 5 is a flowchart representation of a method 500 of detecting and transmitting packets with a wireless AP that is capable of different PHY configurations in a network environment (e.g., the example network environment 100a shown in FIG. 1A, or the example network environment 100c shown in FIG. 1C) in accordance with some embodiments. In some embodiments, the method 500 is performed by a device including a MAC preprocessor (e.g., the MAC preprocessor 108 shown in FIG. 1A or the MAC preprocessor 137 shown in FIG. 1C) or an associated AP (e.g., the AP 107 shown in FIG. 1A or the AP 148 shown in FIG. 1C). In some embodiments, a set of computer readable instructions that are executed at a device including the MAC preprocessor (e.g., a MAC preprocessor such as the MAC preprocessor 108 shown in FIG. 1A or the MAC preprocessor 137 shown in FIG. 1C) or the associated AP (e.g., the AP 107 shown in FIG. 1A or the AP 148 shown in FIG. 1C) implements the method 200.

To that end, as represented by block 501, in some embodiments the method 500 includes obtaining a multi-protocol schedule (e.g., the multi-protocol schedule 101 shown in FIGS. 1A-1C) from a virtual service engine (the virtual service engine 105 shown in FIGS. 1A-1C). In some embodiments, the multi-protocol schedule includes scheduling information for packets related to a plurality of wireless protocols.

As mentioned above, TSCH is widely used in industrial wireless sensor networks due to its high reliability and energy efficiency. The TDMA and channel hopping-based MAC protocols were developed for energy efficient and reliable communication in wireless sensor networks composed of low-power wireless devices. These protocols perform synchronous and deterministic communications based on time slot schedules in units of the slot frame, a group of time slots that continuously repeats over time. TDMA uses a deterministic schedule to reduce idle listening and collisions in packet transmission. Channel hopping mitigates packet transmission failures that might occur due to multi-path fading or channel conflicts through frequency diversity. These protocols perform channel hopping in time slots along the hopping pattern and provide simultaneous communications in a single time slot using a channel off set.

All nodes in a TSCH network are synchronized. To that end, the MAC preprocessor 107 splits the time into time slots. A time slot is long enough for a MAC frame to be sent from node A to B, and for node B to reply with an acknowledgement ("ACK") frame indicating successful reception. Time slot duration is not defined by protocol standards. For example, in radios that are compliant with IEEE 802.15.4 (ZIGBEE) operating in a 2.4 gigahertz (GHz) frequency band, a maximum-length frame of 127 bytes takes approximately 4 ms to transmit and an "ACK"

frame takes approximately 1 ms. In the above example, if a time slot is 10 ms, this leaves 5 ms for operations such as a radio turnaround, packet processing and security operations. The time slots are grouped into one or more slot frames. A slot frame continuously repeats over time. Similar to the time slot duration, TSCH does not impose a slot frame size. As such, depending on the function of an application, the slot frames can range from 10's to 1000's of time slots. To that end, the shorter the slot frame, the more often a time slot repeats. This results in more available bandwidth but also higher power consumption.

In some embodiments, the scheduling information includes at least one of a time slot for packets related to particular wireless protocols, channel information for the packets, and key information for decrypting the packets.

In some embodiments, the scheduling information includes time slot information corresponding to a time slot counter called an absolute slot number (ASN). The ASN is the total number of time slots that have elapsed since the start of the network. When creating a new network, the ASN is initialized to 0. From then on, the ASN is monotonically ascending at each time slot. For example, ASN=(k*S+t), where k is the slot frame cycle (e.g., the number of slot frame repetitions since the network started), S is the slot frame size, and t is the slot offset. A node learns the current ASN when the node joins the network. All nodes know the current value of the ASN at any time due to the nodes being synchronized. In some embodiments, the ASN is encoded as a 5-byte number. This allows the ASN to increment for a long time (e.g., hundreds of years) without wrapping over. In some embodiments, the ASN calculates which channel frequency to communicate on and can also be used for security-related operations.

The nodes must maintain tight synchronization due to the slotted nature of communication in the network. All nodes are assumed to have clocks. However, neighbor nodes need to periodically re-synchronize because the clocks in different nodes may drift with respect to each other.

In some embodiments, the scheduling information also includes transmission information such as a channeloffset for the packet, which is used by a scheduling function to compute a channel frequency. In some embodiments, the scheduling function also uses the ASN and/or a receiver MAC address to compute a channel frequency. In some embodiments, parameters for computing the channel frequency specify a "slotoffset" and a "channeloffset". For example, when node A has a transmit call to node B with a "channeloffest 5" parameter, node B has a receive call from node A on the same "channeloffset" parameter. When calculating a multi-protocol schedule, each node is aware of all neighbors that are in a transmission range in order to avoid unwanted overlaps in the time-frequency domain.

In some embodiments, the scheduling information also includes key information for decrypting the packets related to a wireless protocol in order to authenticate MAC frames. In some embodiments, the MAC preprocessor (e.g., the MAC preprocessor 108 shown in FIG. 1A or the MAC preprocessor 137 shown in FIG. 1C) uses the key information in order to determine how to decrypt the packets. In some embodiments, the key information defines a mechanism in order to allow the secure transfer of application data between nodes. In some embodiments, the key information defines the keying material and authentication mechanism needed by a new node to join an existing network.

As represented by block 503, the method 500 includes reconfiguring a transceiver to receive a packet according to a particular protocol. In some embodiments, a wireless AP (e.g., the AP 107 as shown in FIG. 1A or the AP 148 shown in FIG. 1C) includes a PHY that supports multiple RATs. These wireless APs include a radio capable of different PHY configurations depending on the modulation type and operating frequency. To that end, the radio adjusts or reconfigures its PHY configuration in order to receive or transmit packets in accordance with particular needs of an application at each time slot. For example, IEEE 802.15.4 defines PHY layers: a first PHY layer that uses frequency shift keying (FSK) modulation, a second PHY layer that uses orthogonal frequency-division multiplexing (OFDM) modulation, and a third PHY layer that uses offset quadrature phase-shift keying (O-QPSK) modulation.

As represented by block 505, the method 500 includes detecting, by a MAC preprocessor, the packet in accordance with the multi-protocol schedule. For example, the MAC preprocessor detects a first packet related to a first RAT during a time and according to a channel frequency indicated by the multi-protocol schedule. In some embodiments, the MAC preprocessor injects the first packet from a virtual gateway operating according to the first RAT at an explicit time and channel frequency for the particular wireless protocol.

As represented by block 507, the method 500 includes attempting, by a key service engine (e.g., the key service engine 311 shown in FIG. 3), to decrypt the packet using a key. In some embodiments, a device or key service engine may include a key listener to receive authorization and keys transmitted from the individual virtual gateways. In some embodiments, the MAC preprocessor uses the keys received by the key listener for cryptographic security services implemented in order to enable decryption of the keys and data. Cryptographic services may be implemented through a combination of hardware, firmware, software, or a suitable combination thereof.

As represented by block 509, the method 500 includes determining, by the key service engine, whether the first packet decryption is successful. If the decryption is not successful ("No" path from block 509), the packet is not transmitted, and the method 500 ends. On the other hand, if the decryption method is successful ("Yes" path from block 509), then, as represented by block 511, the MAC preprocessor transmits the packet to the respective virtual wireless gateway.

As represented by block 513, the MAC preprocessor determines if there are any more remaining time slots in the multi-protocol schedule. If there are remaining time slots ("Yes" path from block 513), the method 500 includes returning to block 503 and reconfiguring a transceiver to transmit or receive the packet according to a particular protocol in accordance with the multi-protocol schedule. In other words, the method 500 includes repeating the process for the subsequent time slot in the multi-protocol schedule. On the other hand, if there are no more remaining time slots ("No" path from block 513), the method 500 ends.

Figure 6:
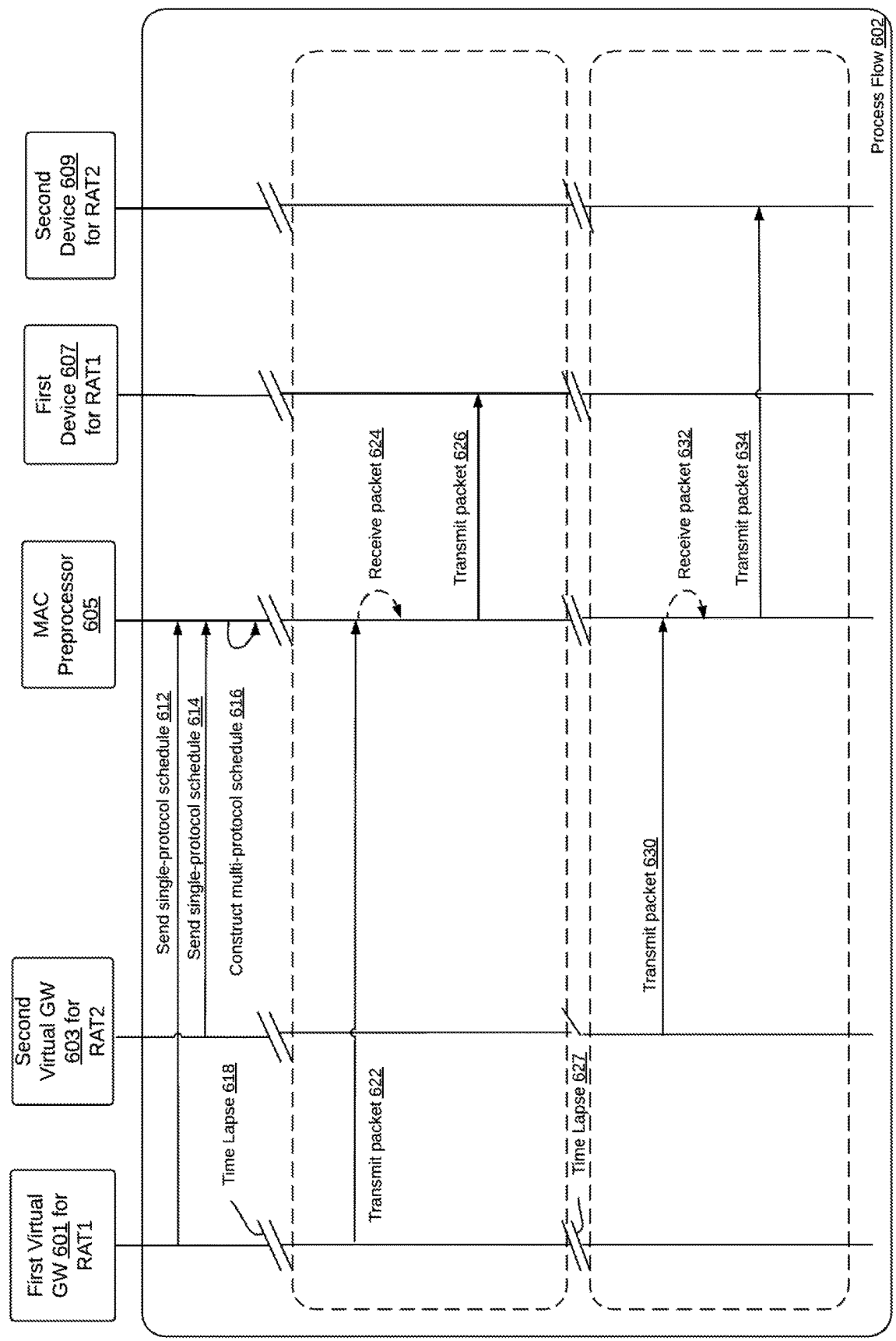
FIG. 6 is a process flow diagram illustrating the detection and transmission of packets downstream in accordance with some embodiments.

FIG. 6 depicts a process flow 602 implemented by system for detecting and transmitting a packet with an agnostic MAC preprocessor in accordance to some embodiments. As an option, one or more instances of the process flow 602 or any aspect thereof may be implemented in the context of the architecture and functionality of the embodiments described herein. Also, the process flow 602 or any aspect thereof may be implemented in any desired environment. In some embodiments, a first virtual gateway 601 operating according to a first RAT, a second virtual gateway 603 operating according to a second RAT, a MAC preprocessor 605, a first device 607 operating according to the first RAT, and a second device 609 operating according to the second RAT exhibit a set of high-level interactions (e.g., operations, messages, etc.) as shown in the process flow 602 in FIG. 6.

In some embodiments, as represented by operation 612, a first virtual gateway 601 operating according to a first RAT (e.g., the first virtual gateway 115*a* operating according to the first RAT shown in FIGS. 1A-1C) sends a single-protocol schedule associated with the first RAT to the MAC preprocessor 605. In some embodiments, the first virtual gateway 601 operating according to the first RAT includes the single-protocol schedule associated with the first RAT with a packet as an indication to transmit the packet at a particular "slot offset" and a "channel offset" in operation 622. The particular "slot offset" and the "channel offset" is specified in the single-protocol-schedule associated with the first RAT.

In some embodiments, as represented by operation 614, a second virtual gateway 603 operating according to the second RAT (e.g., the second virtual gateway 117*a* for the second RAT shown in FIGS. 1A-1C) sends a single-protocol schedule associated with the second RAT to the MAC preprocessor 605. In some embodiments, the second virtual gateway 603 operating according to the second RAT includes the single-protocol schedule associated with the second RAT with a second packet as an indication to transmit the packet at a particular "slot offset" and a "channel offset" in operation 630. The particular "slot offset" and the "channel offset" is specified in the single-protocol schedule associated with the second RAT.

In some embodiments, as represented by operation 616, a MAC preprocessor 605 (e.g., the MAC preprocessor 108 shown in FIG. 1A, the MAC preprocessors 145 and 147 shown in FIG. 1B, or the MAC preprocessor 137 shown in FIG. 1C) merges the single-protocol schedules to form a multi-protocol schedule (e.g., the multi-protocol schedule 101 shown in FIGS. 1A-1C). In accordance with some embodiments, a scheduling module within the virtual service engine (e.g., the virtual service engine 105 shown in FIGS. 1A-1C) merges the single protocol schedules to form the multi-protocol schedule before sending the multi-protocol schedule to the MAC preprocessor 605. In some embodiments, the multi-protocol schedule indicates to a first device 607 operating according to the first RAT and/or a second device 609 operating according to the second RAT to function in a "listen" or "detect" mode.

In some embodiments, after an optional time lapse 618, the process flow 602 includes a first virtual gateway 601 operating according to the first RAT transmitting a first packet related to the first RAT to the MAC preprocessor 605 in accordance with the multi-protocol schedule, as represented by operation 622.

In some embodiments, as represented by operation 624, the MAC preprocessor 605 optionally receives the packet and, as a result, sets the first device 607 operating according to the first RAT to a "listen" or "detect" mode. Operation 624 occurs if the first device 607 operating according to the first RAT is set to a "sleep" or "rest" mode after the optional time lapse 618. In some embodiments, as represented by operation 626, the MAC preprocessor 605 transmits the packet downstream to the first device 607 operating according to the first RAT (e.g., the first device 109 operating according to the first RAT shown in FIG. 1A).

In some embodiments, a transmission packet includes at least one of scheduling information for downstream transmission packets related to a particular protocol and scheduling information for retransmission. In some embodiments, the transmission packet carries scheduling information in order to transmit and possibly retry multiple transmissions to a protocol data unit. In some embodiments, the transmission packet is transmitted via unicast. A unicast stream sends packets to a single recipient on the network. In some embodiments, the transmission packet is tied to a particular time slot. As such, sometimes even a unicast transmission is queued (e.g., Wireless Smart Utility Network (WiSUN)).

In some embodiments, the first virtual gateway 601 operating according to the first RAT or the second virtual gateway 603 operating according to the second RAT transmits a transmission packet via multi-cast by sending packets to a group of hosts on the network. In some embodiments, a virtual service engine ties the scheduling information to one of many multi-cast time slots.

After another optional time lapse 627, the process flow 602 includes a second virtual gateway 603 operating according to the second RAT transmitting a second packet related to the second RAT to the MAC preprocessor 605 in accordance with the multi-protocol schedule as represented by operation 630.

In some embodiments, as represented by operation 632, the MAC preprocessor 605 optionally receives the second packet and, as a result, sets the second device 609 operating according to the second RAT to a "listen" or "detect" mode. Operation 632 occurs if the second device 609 operating according to the second RAT is set to a "sleep" or "rest" mode after the optional time lapse 627. In some embodiments, as represented by operation 634, the MAC preprocessor 605 transmits the packet downstream to the second device 609 operating according to the second RAT (e.g., the second device 111 operating according to the second RAT shown in FIG. 1A).

For the sake of brevity, FIG. 6 shows a single occurrence of transmitting a first packet related to a first RAT and a second packet related to a second RAT in accordance with the multi-based protocol schedule. In some embodiments, the process flow 602 includes multiple occurrences of transmitting packets related to different RATs in accordance with the multi-based protocol schedule.

Figure 7:
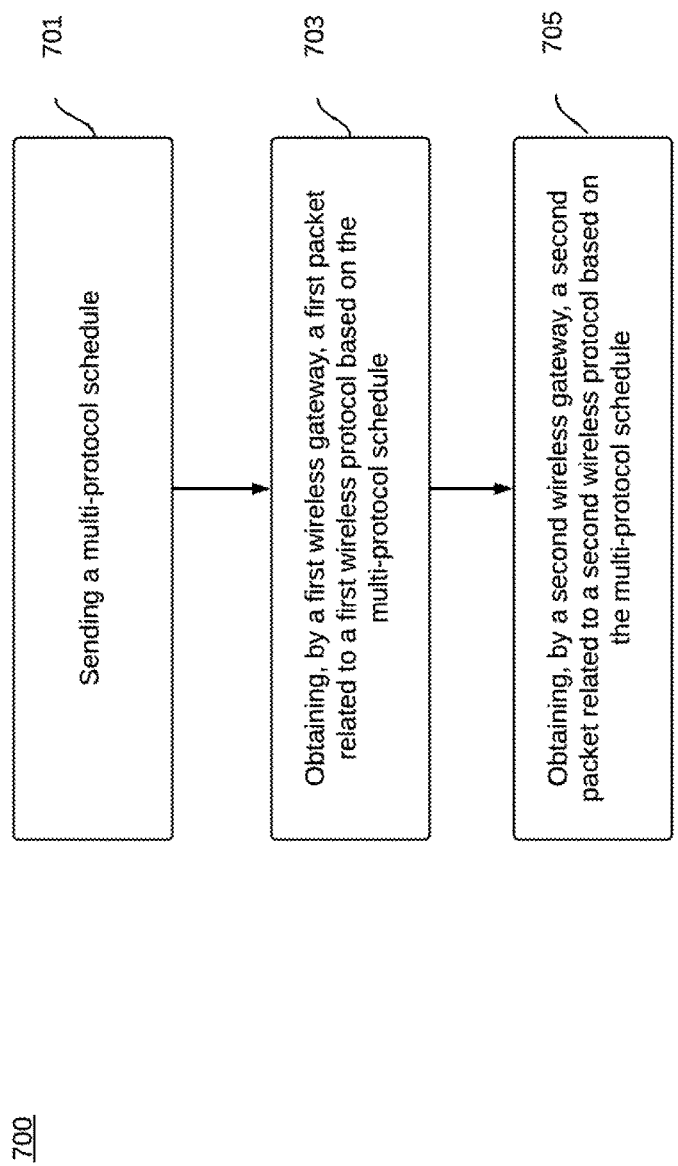
FIG. 7 is a flowchart representation of a method of detecting and obtaining packets in accordance with some embodiments.

FIG. 7 is a flowchart representation of a method 700 of sending multi-protocol schedules and receiving packets in accordance with a multi-protocol schedule in accordance with some embodiments. In some embodiments, the method 700 is performed by a device with one or more processors and non-transitory memory such as a virtual service engine (e.g., the virtual service engine 105 shown in FIGS. 1A-1C). In some embodiments, a set of computer readable instructions that are executed at a device with one or more processors and non-transitory memory such as a virtual service engine implements the method 700.

To that end, as represented by block 701, the method 700 includes sending a multi-protocol schedule (e.g., the multi-protocol schedule 101 shown in FIGS. 1A-1C) that includes scheduling information for packets related to a plurality of wireless protocols. In some embodiments, a single-protocol schedule may be obtained at a scheduling module (e.g., the scheduling module 121 shown in FIGS. 1A-1C) within the virtual service engine (e.g., the virtual service engine 105 shown in FIGS. 1A-1C) for each individual wireless gateway (e.g., the first virtual gateway 115*a* operating according to the first RAT shown in FIGS. 1A-1C, the second virtual gateway 117*a* operating according to the second RAT shown in FIGS. 1A-1C, or the third virtual gateway 119*a* operating according to the third RAT shown in FIGS. 1A-1C). In some embodiments, the virtual service engines combines the single protocol schedules at the virtual service engine to form a multi-protocol schedule before the virtual service engine sends the multi-protocol schedule to a MAC preprocessor (e.g., the MAC preprocessor 108 shown in FIG. 1A, the MAC preprocessors 145 and 147 shown in FIG. 1B, or the MAC preprocessor 137 shown in FIG. 1C).

As represented by block 703, the method 700 includes obtaining, by a first virtual gateway (e.g., the first virtual gateway 115*a* operating according to the first RAT shown in FIGS. 1A-1C), a first packet related to a first wireless protocol based on the multi-protocol schedule.

As represented by block 705, the method 700 includes obtaining, by a second virtual gateway (e.g., the second virtual gateway 117*a* operating according to the second RAT shown in FIGS. 1A-1C), a second packet related to a second wireless protocol based on the multi-protocol schedule.

Figure 8:
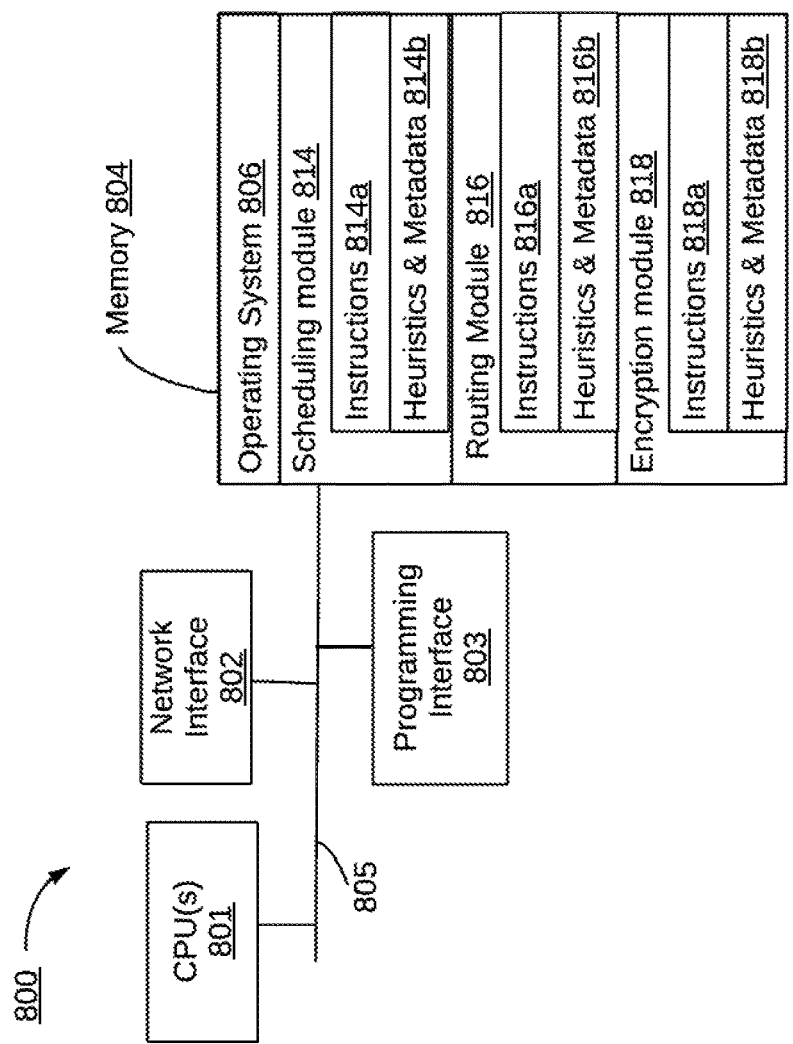
FIG. 8 is a block diagram of an example device in accordance with some embodiments.

FIG. 8 is a block diagram of an example of a device 800 in accordance with some embodiments. For example, in some embodiments, the device 800 corresponds to a virtual service engine (e.g., the virtual service engine 105 shown in FIGS. 1A-1C). While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the device 800 includes one or more processing units (CPUs) 801, a network interface 802, a programming interface 803, a memory 804, and one or more communication buses 805 for interconnecting these and various other components.

In some embodiments, the one or more communication buses 805 include circuitry that interconnects and controls communications between system components. The memory 804 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 804 optionally includes one or more storage devices remotely located from the one or more CPUs 801. The memory 804 comprises a non-transitory computer readable storage medium. In some embodiments, the memory 804 or the non-transitory computer readable storage medium of the memory 804 stores the following programs, modules, and data structures, or a subset thereof including an optional operating system 806, a scheduling module 814, a routing module 816, and an encryption module 818. In some embodiments, one or more instructions are included in a combination of logic and non-transitory memory.

The operating system 806 includes procedures for handling various basic system services and for performing hardware-dependent tasks.

In some embodiments, the scheduling module 814 is configured to obtain and merge single-protocol schedules obtained from individual virtual gateways. To that end, in various embodiments, the scheduling module 814 includes instructions and/or logic 814*a*, and heuristics and metadata 814*b*.

In some embodiments, the routing module 816 is configured to transmit/route the unicast or multicast flow from a current node to a downstream node based on the multi-protocol schedule. To that end, in various embodiments, the routing module 816 includes instructions and/or logic 816*a*, and heuristics and metadata 816*b*.

In some embodiments, the encryption module 818 is configured to generate and encrypt the packet with a key. A person of ordinary skill in the art will appreciate that the encryption module 818 utilizes a variety of techniques to generate a key. In some embodiments, the encryption module 818 utilizes a variety of techniques to generate the key. For example, the encryption module 818 may utilize a variety of public-key algorithms, such as RSA, to generate the key. In some embodiments, the key includes a random number. In some embodiments, the key is the output of a hash function. In some examples, the key is a hash of a time of day, and/or a random number. To that end, in various embodiments, the encryption module 818 includes instructions and/or logic 818*a*, and heuristics and metadata 818*b*.

Moreover, FIG. 8 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another and, in some embodiments, may depend in part on the particular combination of hardware, software, and/or firmware chosen for a particular embodiment.

Figure 9:
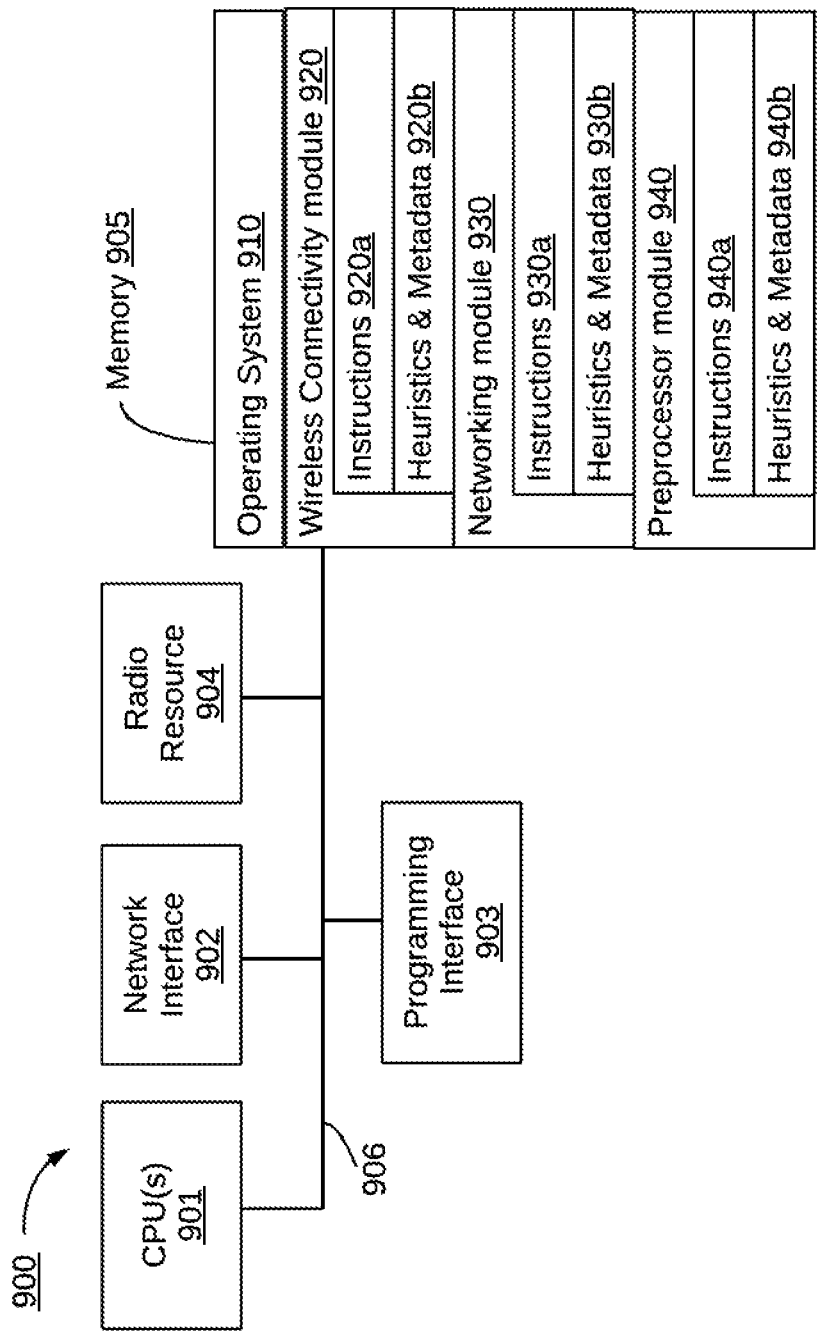
FIG. 9 is a block diagram of an example device in accordance with some embodiments.

FIG. 9 is a block diagram of an example of a device 900 configured in accordance with some embodiments. For example, in some embodiments, the device 900 corresponds to a wireless AP (e.g., the AP 107 shown in FIG. 1A, the APs 141 and 143 shown in FIG. 1B, or the AP 148 shown in FIG. 1C). While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the device 900 includes one or more processing units (CPUs) 901, a network interface 902, a programming interface 903, a radio resource 904, memory 905, and one or more communication buses 906 for interconnecting these and various other components.

In some embodiments, the one or more communication buses 906 include circuitry that interconnects and controls communications between system components. The memory 905 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 905 optionally includes one or more storage devices remotely located from the one or more CPUs 901. The memory 905 comprises a non-transitory computer readable storage medium. In some embodiments, the memory 905 stores the following programs, modules, and data structures, or a subset thereof including an optional operating system 910, a wireless connectivity module 920, a networking module 930, and a preprocessing module 940. In some embodiments, one or more instructions are included in a combination of logic and non-transitory memory.

The operating system 910 includes procedures for handling various basic system services and for performing hardware-dependent tasks.

In some embodiments, the radio resource 904 is provided to support and facilitate traffic bearing communications between the device 900 and one or more devices (e.g., the first device 109 operating according to the first RAT, the second device 111 operating according to the second RAT, the third device 113 operating according to the third device shown in FIGS. 1A-1C). In some embodiments, the radio resource 904 includes a radio transceiver. For example, the radio transceiver operates according to IEEE 802.11b, IEEE 802.11g, IEEE 802.11n, IEEE 802.11ac, BLUETOOTH, ZIGBEE, ISA 100.11a, WirelessHART, or the like.

In some embodiments, the wireless connectivity module 920 is configured to provide wireless connectivity to a number of devices (e.g., the first device 109 operating according to the first RAT, the second device 111 operating according to the second RAT, the third device 113 operating according to the third device shown in FIGS. 1A-1C) using the radio resource 904 operating according to any of a number of various wireless networking protocols such as IEEE 802.11b, IEEE 802.11g, IEEE 802.11n, IEEE 802.11ac, BLUETOOTH, ZIGBEE, ISA 100.11a, WirelessHART, or the like. To that end, in various embodiments, the wireless connectivity module 920 includes a set of instructions and/or logic 920a, and heuristics and metadata 920b.

In some embodiments, the networking module 930 is configured to provide network access to one or more devices. To that end, the networking module 930 includes a set of instructions and/or logic 930a, and heuristics and metadata 930b.

In some embodiments, the preprocessor module 940 is configured to obtain a multi-protocol schedule, detect packets related to wireless protocols and transmit the packets to virtual gateways. To that end, the preprocessor module 940 includes a set of instructions and/or logic 940b, and heuristics and metadata 940b.

Moreover, FIG. 9 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various embodiments. The actual number of modules and the division of particular functions and how features are allocated among them will vary from one embodiment to another and, in some embodiments, may depend in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a wireless transceiver, one or more processors, and a non-transitory memory:
   obtaining a multi-protocol schedule, wherein the multi-protocol schedule includes scheduling information characterizing packets associated with a plurality of wireless protocols, wherein each of the plurality of wireless protocols is associated with a respective virtual gateway of a plurality of virtual gateways and wherein the scheduling information includes, at least in part, a plurality of time slots, wherein each time slot of the plurality of time slots is assigned to each of a wireless protocol of the plurality of wireless protocols;
   detecting, by the wireless transceiver, a first packet related to a first wireless protocol of the plurality of wireless protocols based on the multi-protocol schedule, wherein at least one time slot of the plurality of time slots is for packets related to the first wireless protocol of the plurality of wireless protocols and the scheduling information further includes at least one of channel information for the packets related to the first wireless protocol of the plurality of wireless protocols and key information for decrypting the packets related to the first wireless protocol of the plurality of wireless protocols; and transmitting, by the wireless transceiver, the first packet related to the first wireless protocol to a first virtual gateway of the plurality of virtual gateways.

2. The method of claim 1, wherein obtaining the multi-protocol schedule includes:
   obtaining single-protocol schedules from the plurality of virtual gateways, wherein each single-protocol schedule is generated by the respective virtual gateway of the plurality of virtual gateways; and
   merging the single-protocol schedules in order to form the multi-protocol schedule.

3. The method of claim 1, further comprising decrypting the first packet with a key in order to verify whether the first packet is related to the first wireless protocol, wherein the key is associated with the first wireless protocol, and
   wherein transmitting the first packet related to the first wireless protocol includes transmitting the first packet to the first virtual gateway in response to a successful decryption of the first packet with the key.

4. The method of claim 1, further comprising adjusting the wireless transceiver in order to receive the first packet related to the first wireless protocol.

5. The method of claim 1, wherein transmitting the first packet includes tunneling the first packet through a medium access control (MAC) layer.

6. The method of claim 1, further comprising:
   detecting a second packet related to a second wireless protocol of the plurality of wireless protocols based on the multi-protocol schedule; and
   transmitting, by the wireless transceiver, the second packet related to the second wireless protocol to a second virtual gateway of the plurality of virtual gateways, wherein the second virtual gateway is associated with the second wireless protocol.

7. The method of claim 1, further comprising determining whether to send the first packet to at least one of the first virtual gateway of the plurality of virtual gateways and to a second virtual gateway of the plurality of virtual gateways in accordance with the scheduling information.

8. The method of claim 1, further comprising:
   obtaining a transmission packet that includes the scheduling information for transmission packets related to the plurality of wireless protocols, wherein each of the plurality of wireless protocols is associated with the respective virtual gateway of the plurality of virtual gateways; and
   transmitting the transmission packet in accordance with the scheduling information.

9. The method of claim 1, wherein the first packet includes transmit information that is indicative of at least a channel on which the first packet was received, and a particular time slot during which the first packet was received.

10. The method of claim 8, wherein the scheduling information includes information corresponding to one of:
    transmitting the transmission packet in a particular time slot; and
    transmitting the transmission packet in a multi-cast queue.

11. The method of claim 1, wherein the device corresponds to a medium access control (MAC) preprocessor implemented in an access point, wherein the MAC preprocessor is agnostic to wireless protocols.

12. A device comprising:
   a wireless transceiver;
   one or more processors;
   a non-transitory memory; and
   one or more programs stored in the non-transitory memory, which, when executed by the one or more processors, cause the device to:
      obtain a multi-protocol schedule, wherein the multi-protocol schedule includes scheduling information characterizing packets associated with a plurality of wireless protocols, wherein each of the plurality of wireless protocols is associated with a respective virtual gateway of a plurality of virtual gateways and wherein the scheduling information includes, at least in part, a plurality of time slots, wherein each time slot of the plurality of time slots is assigned to each of a wireless protocol of the plurality of wireless protocols;
      detect, by the wireless transceiver, a first packet related to a first wireless protocol of the plurality of wireless protocols based on the multi-protocol schedule, wherein at least one time slot of the plurality of time slots is for packets related to the first wireless protocol of the plurality of wireless protocols and the scheduling information further includes at least one of channel information for the packets related to the first wireless protocol of the plurality of wireless protocols and key information for decrypting the packets related to the first wireless protocol of the plurality of wireless protocols; and
      transmit, by the wireless transceiver, the first packet related to the first wireless protocol to a first virtual gateway of the plurality of virtual gateways.

13. The device of claim 12, wherein obtaining the multi-protocol schedule includes:
    obtaining single-protocol schedules from the plurality of virtual gateways, wherein each single-protocol schedule is generated by the respective virtual gateway of the plurality of virtual gateways; and
    merging the single-protocol schedules in order to form the multi-protocol schedule.

14. The device of claim 12, wherein the one or more programs, when executed by the one or more processors, cause the device to:
    decrypt the first packet with a key in order to verify whether the first packet is related to the first wireless protocol, wherein the key is associated with the first wireless protocol, and
    wherein transmitting the first packet related to the first wireless protocol includes transmitting the first packet to the first virtual gateway in response to a successful decryption of the first packet with the key.

15. The device of claim 12, wherein the one or more programs, when executed by the one or more processors, cause the device to adjust the wireless transceiver in order to receive the first packet related to the first wireless protocol.

16. A non-transitory memory storing one or more programs, the one or more programs comprising instructions, which, when executed by one or more processors of a device with a wireless transceiver, cause the device to:
    obtain a multi-protocol schedule, wherein the multi-protocol schedule includes scheduling information characterizing packets associated with a plurality of wireless protocols, wherein each of the plurality of wireless protocols is associated with a respective virtual gateway of a plurality of virtual gateways and wherein the scheduling information includes, at least in part, a plurality of time slots, wherein each time slot of the plurality of time slots is assigned to each of a wireless protocol of the plurality of wireless protocols;

detect, by the wireless transceiver, a first packet related to a first wireless protocol of the plurality of wireless protocols based on the multi-protocol schedule, wherein at least one time slot of the plurality of time slots is for packets related to the first wireless protocol of the plurality of wireless protocols and the scheduling information further includes at least one of channel information for the packets related to the first wireless protocol of the plurality of wireless protocols and key information for decrypting the packets related to the first wireless protocol of the plurality of wireless protocols; and transmit, by the wireless transceiver, the first packet related to the first wireless protocol to a first virtual gateway of the plurality of virtual gateways.

17. The method of claim 1, wherein the scheduling information for the multi-protocol schedule further includes an action assigned to each of the plurality of time slots for each of the plurality of wireless protocols.

18. The non-transitory memory of claim 16, wherein obtaining the multi-protocol schedule includes:

obtaining single-protocol schedules from the plurality of virtual gateways, wherein each single-protocol schedule is generated by the respective virtual gateway of the plurality of virtual gateways; and merging the single-protocol schedules in order to form the multi-protocol schedule.

19. The non-transitory memory of claim 16, further comprising instructions, which, when executed by the one or more processors of the device with the wireless transceiver, cause the device to:

decrypt the first packet with a key in order to verify whether the first packet is related to the first wireless protocol, wherein the key is associated with the first wireless protocol, and wherein to transmit the first packet related to the first wireless protocol includes to transmit the first packet to the first virtual gateway in response to a successful decryption of the first packet with the key.

20. The non-transitory memory of claim 16, further comprising instructions, which, when executed by the one or more processors of the device with the wireless transceiver, cause the device to:

adjust the wireless transceiver in order to receive the first packet related to the first wireless protocol.

* * * * *